Nov. 30, 1954  R. J. H. CROW  2,695,717
DUAL WHEEL REMOVER
Filed July 9, 1951  2 Sheets-Sheet 1
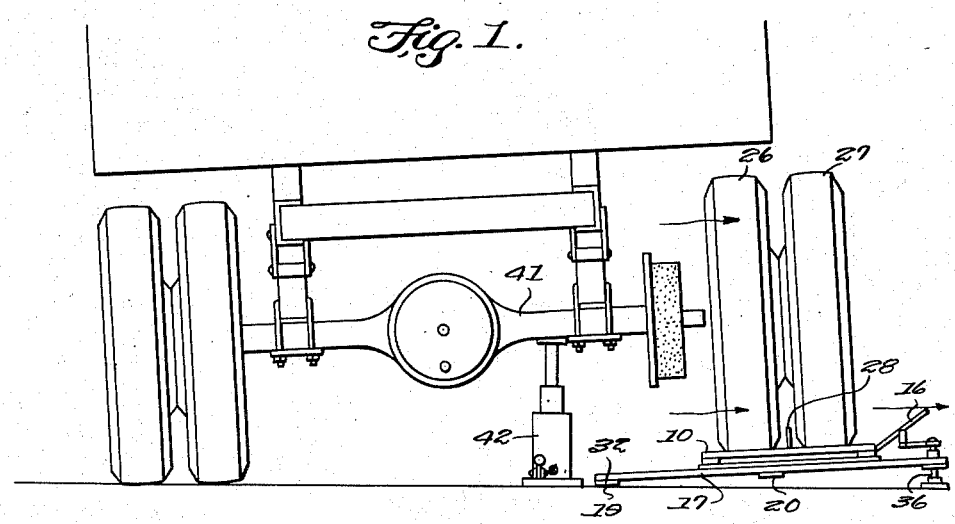
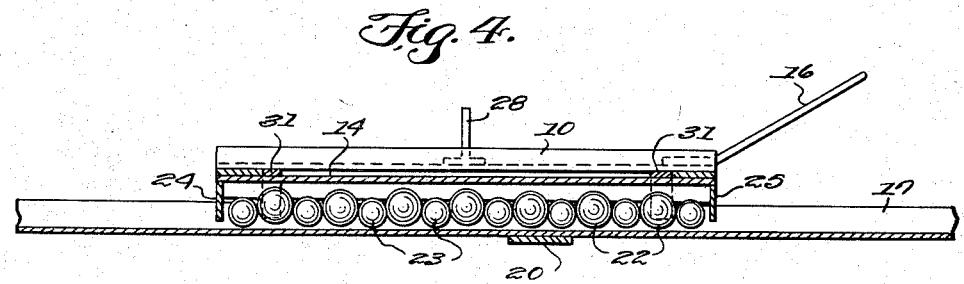
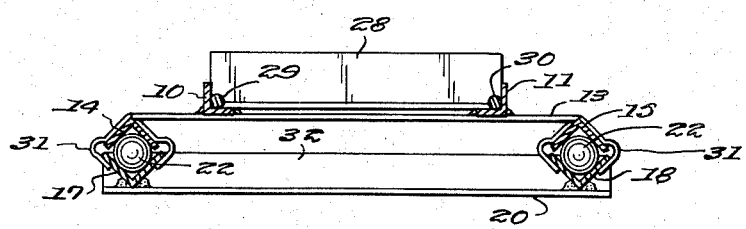
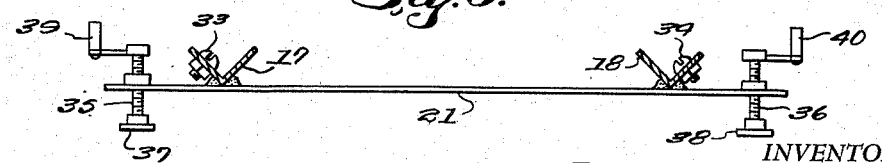
INVENTOR.
Robert J. H. Crow,
BY Victor J. Evans & Co.
ATTORNEYS

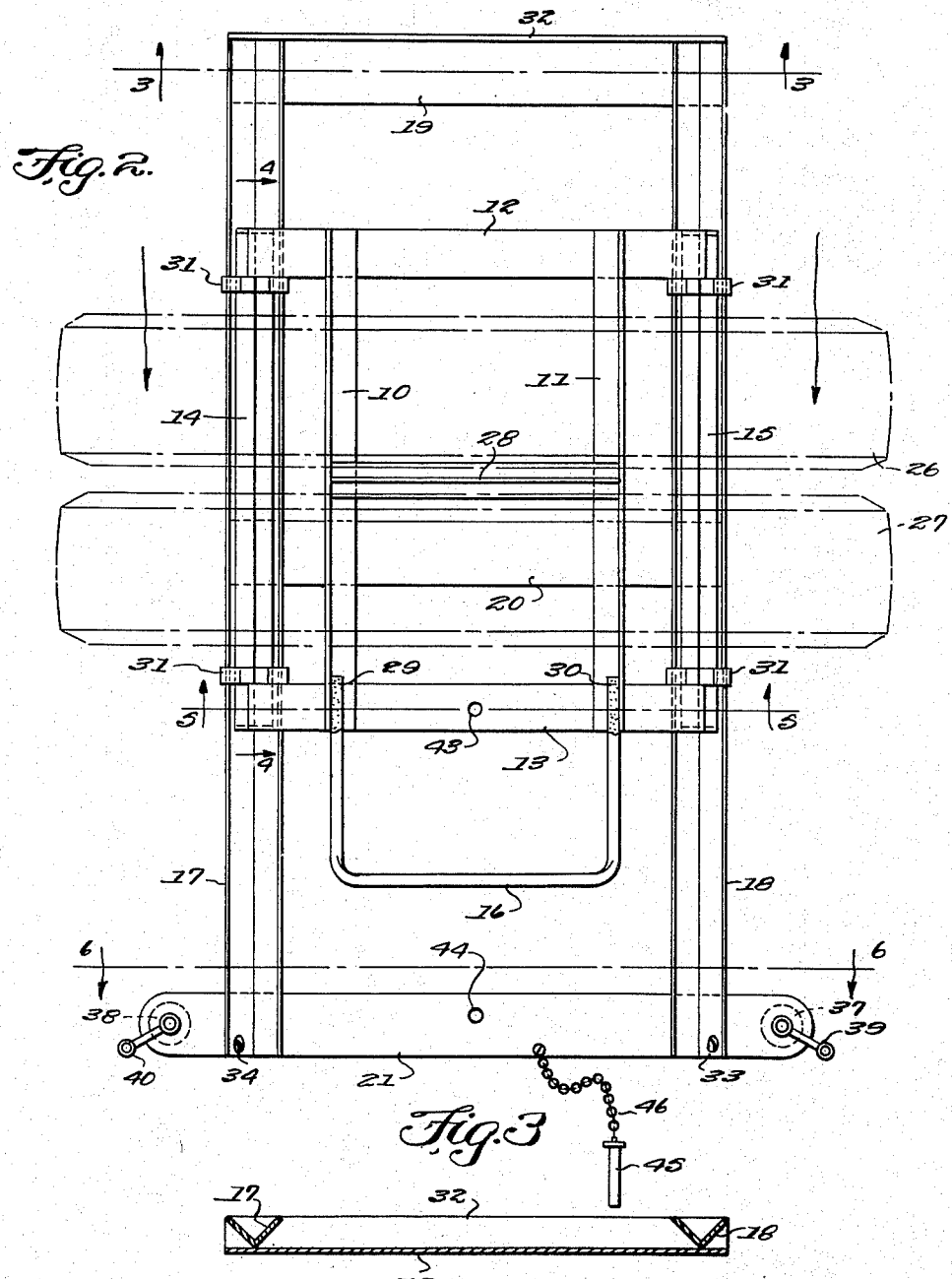

United States Patent Office 2,695,717
Patented Nov. 30, 1954

2,695,717

DUAL WHEEL REMOVER

Robert J. H. Crow, Dillwyn, Va.

Application July 9, 1951, Serial No. 235,876

3 Claims. (Cl. 214—330)

This invention relates to portable devices for removing and replacing dual wheels of motor vehicles, trucks, buses, and the like wherein with one end of an axle jacked upwardly a substantially flat carriage mounted to travel on a pair of tracks is positioned under the wheel whereby the carriage, with the wheels positioned thereon, is free to slide away from or toward the end of the axle.

One important feature of this device is in the fact that it is portable as with the device portable it may readily be moved from one position to another or carried in a vehicle to a location on a highway, or used in substantially any location desired.

The purpose of this invention is to provide means for sliding dual wheels away from the end of an axle and to operative position upon the axle whereby the wheels are readily removable for repairing and replacing tires thereon.

In the conventional method of repairing and replacing heavy dual wheels of motor vehicles, such as trucks and buses it is difficult, because of the weight of the wheels, to slide the wheels away from the end of the axle so that they may be conveyed to a position in a shop or the like and after the tires are replaced it is also difficult, because of the weight of the wheels, to align the centers of the hubs of the wheels with the center of the axle so that the wheels may be replaced on the axle. With this thought in mind this invention contemplates a tool having a carriage slidably mounted thereon with the tool and carriage adapted to be positioned below the jacked up motor vehicle wheels and with the carriage adapted to receive the comparatively heavy wheels of a motor vehicle, truck or bus.

The object of this invention is, therefore, to provide means for mounting a motor vehicle wheel carrying carriage on a pair of tracks whereby the carriage with the wheels thereon is readily movable on the tracks.

Another object of the invention is to provide a flat carrier for dual wheels of motor vehicles, such as trucks, buses and the like in which the wheels may readily be removed from an axle and also aligned with the axle when replacing the wheels upon the axle.

A further object of the invention is to provide a tool having a motor vehicle carrying carriage slidably mounted thereon with means for adjusting the carriage with the axis of wheels positioned thereon in alignment with an axle which is of a comparatively simple and economical construction.

With these and other objects and advantages in view the invention embodies a frame having a pair of V-shaped tracks connected by cross bars with jacks in the ends of a cross bar at one end of the frame, and with a carriage having wheel supporting means thereon slidably mounted by roller bearings in the said V-shaped tracks of the frame.

Other features and advantages of the invention will appear from the following description taken in connection with the drawings wherein:

Figure 1 is an end elevational view showing the axle at the rear end of a truck or the like with one end of the axle elevated and with the wheels of the elevated end of the axle removed from the axle and positioned on a carriage that is slidably mounted on the supporting frame.

Figure 2 is a plan view illustrating the dual wheel carrier.

Figure 3 is a cross section through one end of the frame of the carrier taken on line 3—3 of Fig. 2.

Figure 4 is a longitudinal section through one of the rails of the carrier taken on line 4—4 of Fig. 2, and with the ends of the rails broken away.

Figure 5 is a cross section through the improved dual tire remover, taken on line 5—5 of Fig. 2.

Figure 6 is a cross section through the dual wheel remover taken on line 6—6 of Fig. 2.

Referring now to the drawings wherein like reference characters denote corresponding parts the improved dual wheel remover of this invention includes a carriage having spaced angle bars 10 and 11 carried by transversely positioned bars 12 and 13, mounted on inverted V-shaped beams 14 and 15 and provided with a loop 16 that forms a handle.

The carriage is positioned to travel on parallel longitudinally disposed V-shaped rails 17 and 18. The rails are mounted on cross bars 19, 20 and 21, and in the design shown a carriage is mounted with load carrying balls 22 with smaller spacing balls 23 positioned between the load carrying balls and the balls are retained in position in the beams of the carriage by flanges 24 and 25.

With the balls mounted in each of the rails and retained in the beams 14 and 15 of the carriage in this manner the carriage is free to roll in the rails whereby dual wheels, as indicated by the numerals 26 and 27, from the hubs of which studs or nuts have been removed may be rolled away from the end of the axle or rolled toward the axle to replace the wheels thereon.

The carriage may be provided with a T-shaped bar 28 that is positioned to extend between the wheels dividing the upper surface of the carriage into a pair of saddles, as shown in Fig. 1. The bar 28 is secured in position, preferably by welding, as shown at the points 29 and 30.

The beams 14 and 15 are provided with clips, as indicated by the numeral 31 and, as shown in Fig. 5, these clips extend downwardly over the flanges of the rails 17 and 18 for preventing the carriage being accidentally removed from the rails.

It will be understood that although the clips 31 on the beams 14 and 15 are shown on both sides of the tracks the clips may only be provided on the outside and may extend straight downwardly from the members 12 and 13 with the lower edges extended under the flanges of the members 17 and 18.

The end rail 19 is provided with a flange 32, that forms a stop and the opposite ends of the rails are provided with bolts 33 and 34 that are positioned to engage the balls of the carriage to limit upward movement of the carriage.

The cross bar 21 at the outer or upper end of the supporting frame is provided with screw jacks 35 and 36, that are threaded in the ends of the bar 21. The lower ends of the screws are provided with swivel sockets 37 and 38, respectively and the upper ends of the screws are provided with cranks 39 and 40. By these screw jacks or leveling screws or by other suitable means the outer end of the supporting frame is elevated, as illustrated in Fig. 1, whereby the axis of the wheels 26 and 27 positioned on the carriage are aligned with the axis of the axle, which is indicated by the numeral 41. With the dual wheels positioned in this manner the wheels slide on the end of the axle as the carriage moves downwardly in the tracks and by the same means the wheels are readily removed from the end of the axle.

In this design the end of the axle is elevated by a jack 42 and it will be understood that a jack of any suitable type or design may be used.

The end bar 13 of the carriage is provided with an opening 43 and a similar opening 44 is provided in the cross bar 21 so that with the carriage positioned on the end of the supporting frame a pin 45 carried by a chain 46 may be placed through the openings 43 and 44 to retain the carriage in position on the end of the frame.

As illustrated in Fig. 1 the supporting frame of the tool is positioned under a dual wheel with the wheel elevated, as shown, and with the studs or nuts removed the wheels are readily positioned on the carriage with outward travel of the carriage the wheels are removed from the end of the axle so that they may be readily rolled or conveyed to a suitable point for repair.

By the same means the wheels are replaced on the carriage and the carriage with the wheels thereon moved on the tracks to position the wheels on the axle.

With the parts arranged in this manner the end of the axle is jacked upwardly so that the wheel removing tool may be placed below the dual wheels. With the tool in position the outer end is elevated by the jacks or screws 35 and 36 until the surface of the carriage is the plane extended through the axis of the axle of the vehicle. The wheels of the vehicle are raised or lowered by the jack 42. With the sliding carriage in position and with the wheel holding studs or nuts removed the carriage carries the dual wheels outwardly away from the end of the axle, and in replacing the wheels the same steps are taken except that the carriage travels inwardly toward the vehicle.

It will also be noted that the tire carrying tool of this invention may be used for separating sections of rear axles where the axles are joined at the center.

The dual wheel remover of this invention, therefore, constitutes a separate and independent unit and with the part compact as disclosed it is portable so that it may readily be moved from one position to another.

It will be understood that modifications may be made in the design and arrangement of the parts without departing from the spirit of the invention.

What is claimed is:

1. In a motor vehicle wheel carrier, the combination which comprises spaced parallel angle iron rails, V-shape in cross section, cross bars connected to and positioned at the ends of the rails and at points intermediate of the ends for connecting and supporting said rails, said cross bars supporting the rails in upwardly disposed positions with vertexes thereof extended downwardly and with flanges extended upwardly and outwardly, a carriage positioned above and adapted to travel longitudinally of said rails, said carriage including a pair of tire carrying saddles comprising spaced longitudinally disposed bars connected at the ends with transverse bars and at a point intermediate of the ends with a T-bar having an extended vertically disposed web, the ends of said transverse bars and T-bar being mounted on inverted angle beams, aligned with and positioned above said parallel angle iron rails, substantially continuous rows of balls positioned below said angle beams of the carriage and in said parallel angle iron rails providing continuous support for said angle beams of the carriage, and said angle beams of the carriage having flanges at the ends and depending clips extended downwardly over the flanges of the rails for preventing accidental displacement of the carriage from said parallel rails, and said carriage having a U-shaped handle extended from one end.

2. In a motor vehicle wheel carrier, the combination which comprises spaced parallel angle iron rails, V-shape in cross section, cross bars connected to and positioned at the ends of the rails and at points intermediate of the ends for connecting and supporting said rails, said cross bars supporting the rails in upwardly disposed positions with vertexes thereof extended downwardly and with flanges extended upwardly and outwardly, a carriage positioned above and adapted to travel longitudinally of said rails, said carriage including a pair of tire carrying saddles comprising spaced longitudinally disposed bars connected at the ends with transverse bars and at a point intermediate of the ends with a T-bar having an extended vertically disposed web, the ends of said transverse bars and T-bar being mounted on inverted angle beams, aligned with and positioned above said parallel angle iron rails, substantially continuous rows of balls positioned below said angle beams of the carriage and in said parallel angle iron rails providing continuous support for said angle beams of the carriage, and said angle beams of the carriage having flanges at the ends and depending clips extended downwardly over the flanges of the rails for preventing accidental displacement of the carriage from said parallel rails, said carriage having a U-shaped handle extended from one end, the cross bar at one of the ends of said parallel rails having an opening therein and the transverse bar at the corresponding end of the carriage having a similar opening adapted to register with the opening of the cross bar, and a pin flexibly connected to the cross bar at the end of the rails and adapted to be inserted through the openings of the transverse and cross bars for retaining the carriage at one end of the carrier.

3. In a motor vehicle wheel carrier, the combination which comprises spaced parallel angle iron rails, V-shape in cross section, cross bars connected to and positioned at the ends of the rails and at points intermediate of the ends for connecting and supporting said rails, said cross bars supporting the rails in upwardly disposed positions with vertexes thereof extended downwardly and with flanges extended upwardly and outwardly, a carriage positioned above and adapted to travel longitudinally of said rails, said carriage including a pair of tire carrying saddles comprising spaced longitudinally disposed bars connected at the ends with transverse bars and at a point intermediate of the ends with a T-bar having an extended vertically disposed web, the ends of said transverse bars and T-bar being mounted on inverted angle beams, aligned with and positioned above said parallel angle iron rails, substantially continuous rows of balls positioned below said angle beams of the carriage and in said parallel angle iron rails providing continuous support for said angle beams of the carriage, and said angle beams of the carriage having flanges at the ends and depending clips extended downwardly over the flanges of the rails for preventing accidental displacement of the carriage from said parallel rails, said carriage having a U-shaped handle extended from one end, and screw jacks threaded in the cross bar at one of the ends of the parallel rails for adjusting the elevation of the corresponding end of the carrier.

References Cited in the file of this patent

UNITED STATES PATENTS

| Number | Name | Date |
|---|---|---|
| 449,126 | Little | Mar. 31, 1891 |
| 898,945 | Weibel-Mulisch | Sept. 15, 1908 |
| 1,917,923 | Clarke | July 11, 1933 |
| 1,937,592 | Rich | Dec. 5, 1933 |
| 2,155,790 | Gougar | Apr. 25, 1939 |
| 2,369,603 | Phillips | Feb. 13, 1945 |
| 2,503,138 | Smith | Apr. 4, 1950 |
| 2,518,102 | Ward | Aug. 8, 1950 |
| 2,525,351 | Hennings et al. | Oct. 10, 1950 |
| 2,539,274 | Sagen | Jan. 23, 1951 |
| 2,600,741 | Drum | June 17, 1952 |